Aug. 25, 1953  R. POLK, SR., ET AL  2,649,731
CITRUS FRUIT JUICE EXTRACTING METHOD AND APPARATUS
Filed Sept. 27, 1948  7 Sheets-Sheet 1

Inventors
RALPH POLK SR
RALPH POLK JR.

By
Semmes, Keegin, Robinson & Semmes
ATTORNEYS

Aug. 25, 1953 — R. POLK, SR., ET AL — 2,649,731
CITRUS FRUIT JUICE EXTRACTING METHOD AND APPARATUS
Filed Sept. 27, 1948 — 7 Sheets-Sheet 3

Inventors
RALPH POLK SR.
RALPH POLK JR.

Semmes, Keegin, Robinson & Semmes
ATTORNEYS

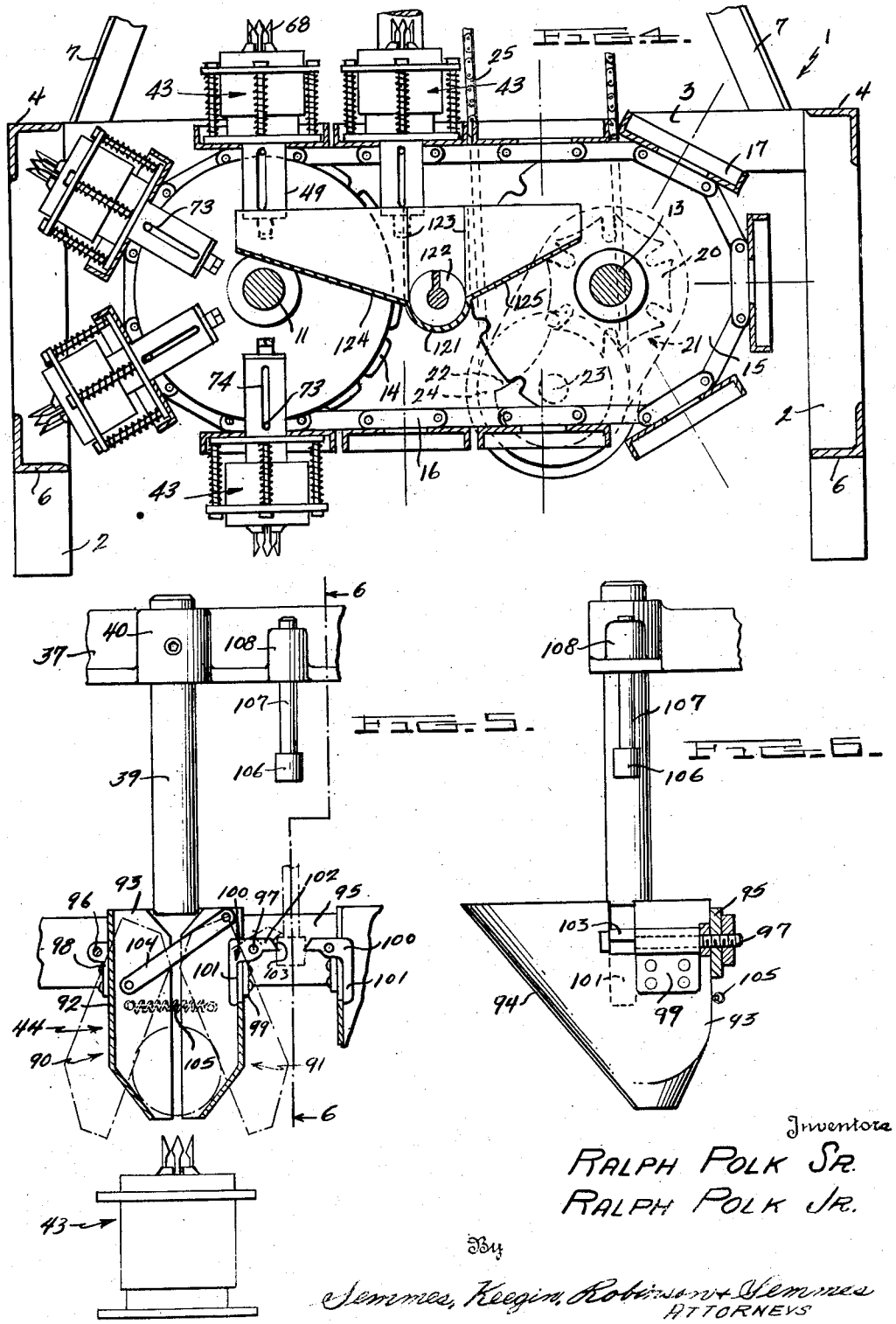

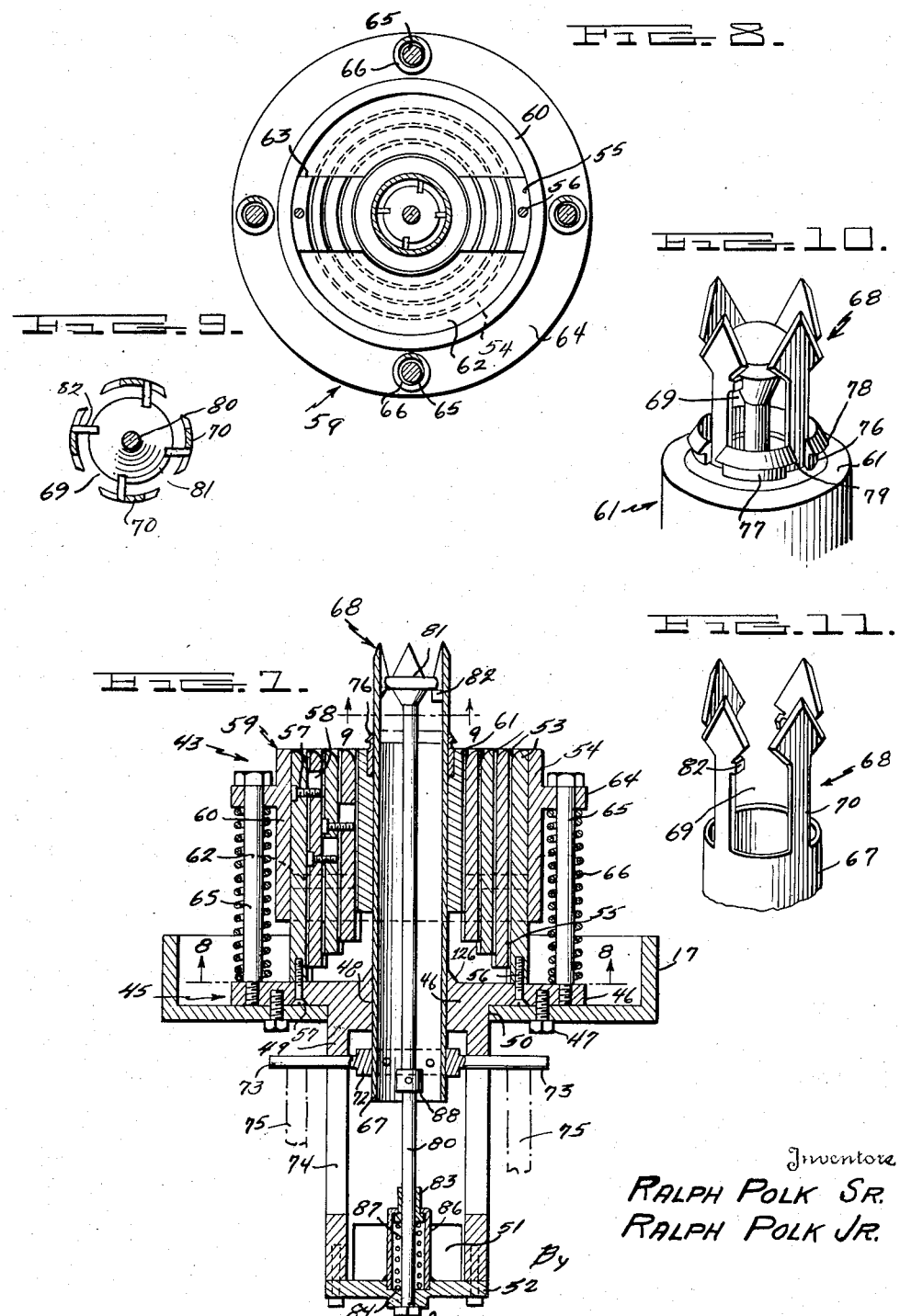

Aug. 25, 1953  R. POLK, SR., ET AL  2,649,731
CITRUS FRUIT JUICE EXTRACTING METHOD AND APPARATUS
Filed Sept. 27, 1948  7 Sheets-Sheet 6

Inventors
RALPH POLK SR.
RALPH POLK JR.
By Semmes, Keegin Robinson & Semmes
ATTORNEYS Aug. 25, 1953 R. POLK, SR., ET AL 2,649,731
CITRUS FRUIT JUICE EXTRACTING METHOD AND APPARATUS
Filed Sept. 27, 1948 7 Sheets-Sheet 7
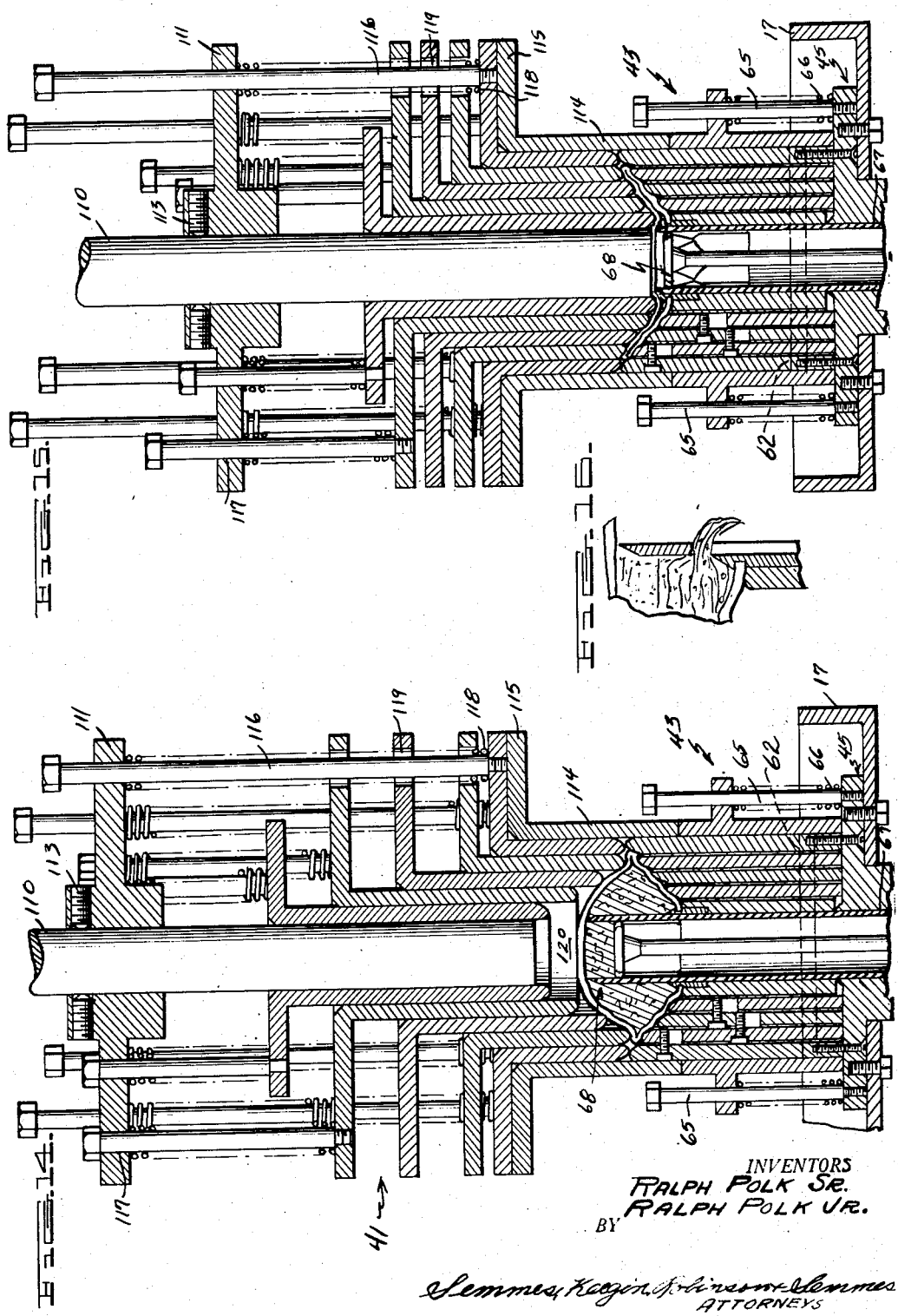
INVENTORS
RALPH POLK SR.
RALPH POLK JR.
BY
ATTORNEYS Patented Aug. 25, 1953

2,649,731

UNITED STATES PATENT OFFICE 2,649,731

CITRUS FRUIT JUICE EXTRACTING
METHOD AND APPARATUS

Ralph Polk, Sr., and Ralph Polk, Jr., Tampa, Fla., assignors, by mesne assignments, to Food Machinery and Chemical Corporation, San Jose, Calif., a corporation of Delaware Application September 27, 1948, Serial No. 51,364

27 Claims. (Cl. 100—39)

This invention relates to the extraction of fruit juices and more particularly to an industrial method and apparatus for the extraction of juice from citrus fruit such as oranges and grapefruit.

The systems for extracting citrus fruit juice generally used industrially fall into three general types. In one, the fruit is completely peeled and the juice extracted in a continuous screw expeller press. It is difficult and costly, however, to completely remove all of the peel, albedo, and vascular material, the principles of which impart a bitter taste to the juice. Furthermore, in this method of extraction, the rag and seed are often severely mascerated, freeing their undesirable constituents into the juice. In addition, this method does not readily lend itself to completely automatic operation.

A second method, which is more commonly practiced, is carried out by first cutting the whole fruit into halves or smaller sections and subjecting these sections to the squeezing operation of a plunger and cooperating cup which holds the section. Due to wide variation in fruit sizes and peel thickness, however, complete extraction is difficult to obtain without substantial liberation of peel extractives and admixture of these substances with the expressed juice. Moreover, the preliminary cutting of the fruit requires additional mechanism which is complicated, initially costly, and expensive to service and maintain.

The third method also requires halving the fruit. In this method, however, the juice bearing pulp is reamed from the peel halves by a rapidly rotating burr on which the half fruit is pressed. This burr produces a tearing action on the pulp, membrane, and pithy substance of the fruit with resulting contamination of the juice by their contained substances as in the case of the first discussed method, and in addition, the liberated juice is subjected to considerable aeration, particularly with high speed burrs.

In order to eliminate peeling or cutting the fruit into smaller sections, some development has been made in the extraction of the juice from whole fruit, that is, fruit with its peel or the major portion thereof intact. In one of such systems, which has been practiced commercially, a whole fruit is subjected to the peel supporting pressure of a pair of axially opposed cups which contain the fruit and the sides of which are slotted to permit inter-digitation when brought together, one of the cups being provided with a knife to cut a plug or other opening in the peel of the fruit through which the juice is expressed under pressure of the cups. This system is likewise open to several objections. First, the cups must be shaped to accurately conform to the shape of the fruit, and as a result the cups will only accept fruit of a very limited size range and, therefore, require that the fruit first be graded. Secondly, very high pressures are required, and thirdly, considerable peel mutilation results due to the cutting action of the slotted cups which express an unusually large amount of peel extractive which must be segregated from the juice.

It is an object of this invention, therefore, to provide a method and apparatus for extracting the juice from citrus fruit which overcomes some of the disadvantages and objections of the prior art.

Another object of the invention is to provide a method and apparatus for expressing the juice from whole citrus fruit which performs complete extraction at only moderate pressures.

Still another object of the invention is to provide a method and apparatus of the above character which lends itself to rapid and completely automatic operation.

Yet another object of the invention is to provide a method and apparatus of the above character which may be employed without change in the extraction of juice from whole, unsized citrus fruit of a wide range of sizes and peel thicknesses.

With the above and other important objects and advantages in view, which will become apparent during the course of the following description, the invention consists in the parts and combinations and procedural steps hereinafter set forth with the understanding that various changes may be made therein, such as in the size, shape and arrangement of parts, by the substitution of equivalents, or in the order of the procedural steps, without departing from the spirit of the invention or exceeding the scope of the appended claims.

In order to make the invention more clearly understood it has been made the subject of illustration in the accompanying drawings which show a preferred apparatus for carrying the invention into practical effect.

In the drawings:

Figure 4 is a vertical longitudinal sectional view taken along the line 4—4 of Figure 2 looking in the direction of the arrows;

Figure 5 is a vertical transverse sectional view taken along the line 5—5 of Figure 1 looking in the direction of the arrows;

Figure 6 is a vertical longitudinal sectional view taken along the line 6—6 of Figure 5 looking in the direction of the arrows;

Figure 7 is a transverse sectional view taken along the line 7—7 of Figure 2 looking in the direction of the arrows;

Figure 8 is a cross sectional view taken along the line 8—8 of Figure 7 looking in the direction of the arrows;

Figure 9 is a cross sectional view taken along the line 9—9 of Figure 7 looking in the direction of the arrows;

Figure 10 is a detailed view in perspective of the upper end of the juice tube and plunger assembly;

Figure 11 is a detailed view in perspective of the upper, cutting end of the juice tube;

Figure 14 is a transverse sectional view of the holder and presser head showing their operative relationship at the beginning of pressure stroke;

Figure 15 is a view similar to Figure 14 showing the operative relationship of the parts at the end of the pressure stroke; and Figure 16 is a fragmental sectional view of the juice tube and pulp shear.

Figure 1:
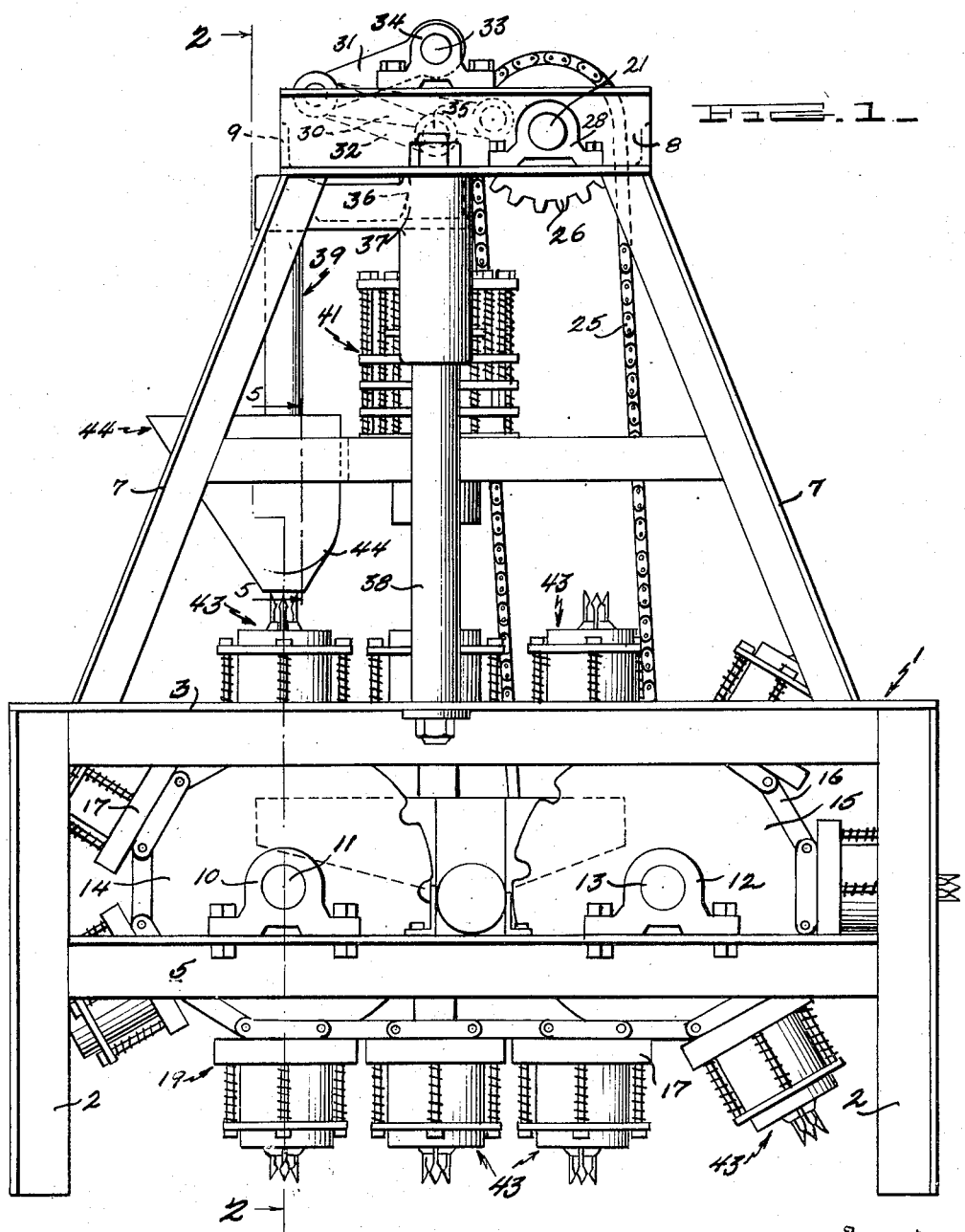
Figure 1 is a side elevational view of the juice extracting machine according to the invention.

For the purpose of the following description the term "whole fruit" shall mean fruit with its outer rind or peel intact except for incision in a limited area for efflux of the juice. "Juice" shall means the edible portion of the pulp and includes ruptured and unruptured juice sacs. "Peel extractives" are principally the citrus oil of the outer peel, but also include the extractable substances of the inner peel, vascular bundles, section membranes, and seed.

Generally, the invention comprises subjecting whole, unpeeled, citrus fruit to opposed pressures concentrically about an axis of the fruit while confining the peel against rupture due to said pressures except in a limited area thereof for efflux of the juice. Preferably, the extracting process is carried out in two stages: in the first, a circular series of arcuate incisions are made about a single axis through the peel of one hemisphere of the fruit and into the pulp through the walls of fruit sections, and pressure is applied to the opposite hemisphere of the fruit in an amount sufficient to bring about a partial rupture of a number of the juice sacs but insufficient to cause rupture of the peel. This preliminary operation has the effect of partial expression of the juice and rendering the fruit pliable preparatory to complete juice extraction by the second stage. In the second stage the fruit is subjected to a series of yielding pressures in annular bands about the axis of the aforesaid incisions applied successively inwardly from the periphery of the fruit towards the center. These pressures reverse the upper hemisphere of the peel against the lower half progressively inwardly toward the center of the fruit completely expressing the juice through openings made by the aforesaid incisions. During the second pressure stage the peel is confined substantially against outward expansion to prevent rupture of the pulp through the peel except in the region of the cuts.

Describing in detail a preferred apparatus for carrying out the invention, reference is made first to Figures 1 to 4 which best illustrate the

General mechanism

As best shown in Figures 1, 2, 3, and 4, the extracting machine comprises a generally rectangular frame 1 which may be of angle iron construction and comprises vertical corner legs 2 connected together by upper, horizontal side rails 3 and upper end rails 4 and lower horizontal side rails 5 and lower end rails 6. Extending upwardly respectively from the side rails 3 are pairs of angularly converging supports 7, to the upper end of each pair of which is secured a channel piece 8. The channel pieces 8 are connected together at their ends by cross angles 9.

Fastened respectively to the lower side rails 5 is a pair of axially aligned bearings 10 in which is rotatably journalled a shaft 11, and a second pair of axially aligned bearings 12 in which is rotatably journalled a shaft 13 parallel with the shaft 11. Rigidly mounted on the shaft 11 is a pair of axially spaced sprocket wheels 14 of relatively large diameter and lying respectively just inside the sides of the frame 1, while a pair of similar sprocket wheels 15 is rigidly secured to the shaft 13 and respectively aligned with the sprocket wheels 14. Passing over the sprockets 14 and 15 are link chains 16 between which is secured a plurality of similar cross slats 17 in the form of outwardly opening channels. An angle iron 18 is secured to the inner face of each of the top side rails 3 between the vertical center lines of the sprockets 14 and 15 and constitute supporting tracks upon which the outer ends of the upper flight of slats 17 ride, as seen clearly in Figure 2.

The above constitutes a conveyor, which is designated generally as 19, for moving the fruit through the machine as will be further described.

The shaft 13, at one end thereof, extends beyond the frame and has secured thereto, as seen in Figure 4, a driven element 20 of a Geneva gear, indicated generally as 21, and whose driving element 22 is mounted on a shaft 23 which carries a sprocket 24. The shaft 23 may be driven in any suitable manner, preferably at a relatively slow speed, such as by means of an electrical motor and reduction gear (not shown). A chain 25 connects the sprocket 24 with a similar sprocket 26 mounted on one end of a crank shaft 27 journalled in a pair of bearings 28 carried respectively by the overhead channels 8.

Figure 3:
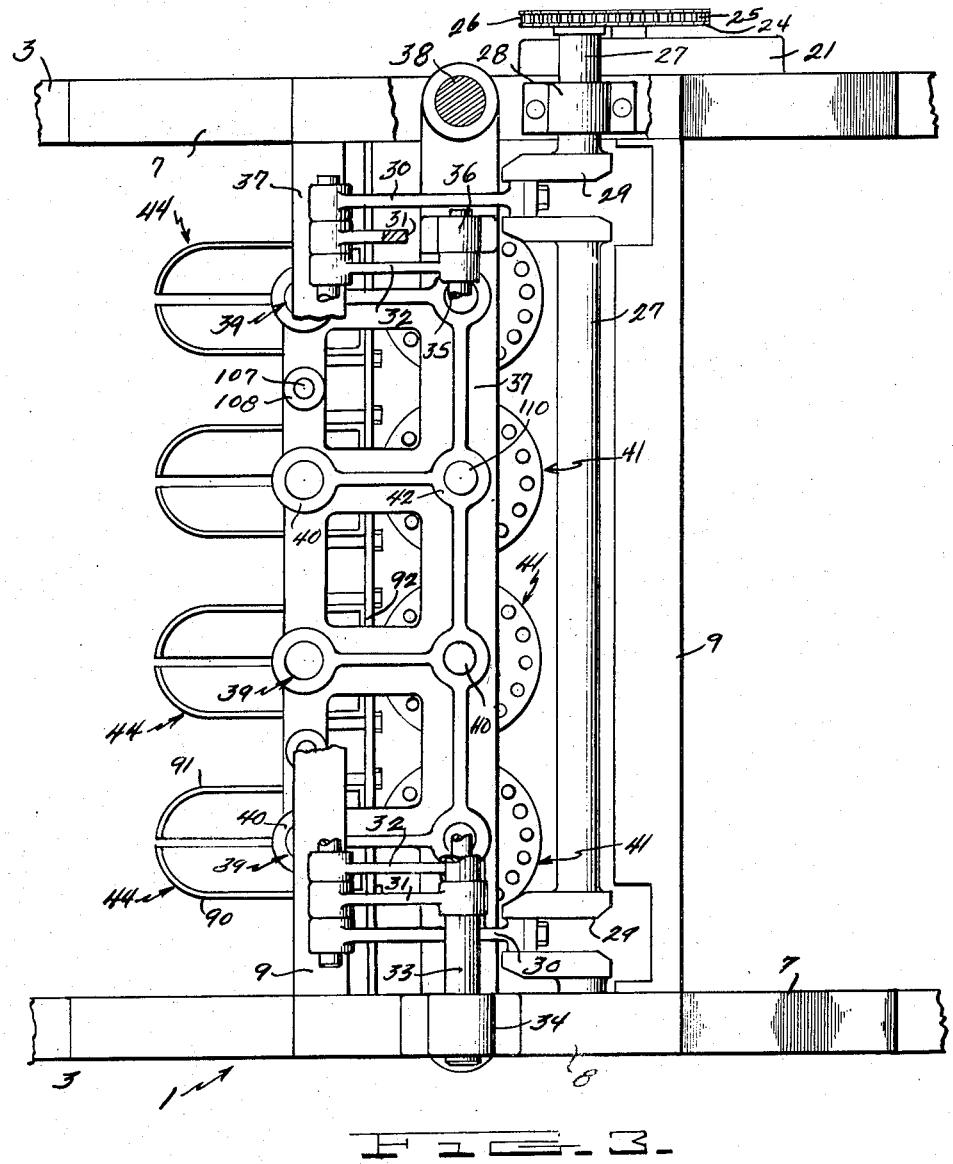
Figure 3 is a fragmental top plan view of the machine shown in Figure 1.

The crank shaft 27, as best seen in Figure 3, is provided with a pair of similar cranks 29, both extending in the same radial direction from the crank shaft 27. A connecting rod 30 connects each of the cranks 29 respectively with the connected ends of a pair of toggle links 31 and 32. The opposite ends of the links 31 are secured to a cross shaft 33 journalled in a pair of bearings 34 secured respectively to the upper flanges of the channels 8, while the opposite ends of the links 32 are connected with a cross shaft 35 mounted in upstanding bearings 36 formed on the upper face of a horizontal ram head 37. The ram head 37 extends transversely across the machine and is slidably mounted on a pair of vertical posts secured at their lower end to the top rail 3 and at their upper end to the channel 8.

Carried by the ram head 37 at the lefthand side thereof, as seen in Figures 1 and 3 (which may be termed the "input" end of the machine) is a laterally aligned series of vertically depending, spaced plungers, indicated generally as 39 and which are respectively secured for axial adjustment in corresponding hollow bosses 40 formed on the head 37. Spaced from the series of plungers 39, longitudinally of the machine or to the right as seen in Figures 1 and 3, is a series of vertically depending presser heads, indicated generally as 41. The presser heads 41 are laterally aligned across the ram head and are respectively aligned longitudinally of the machine with the plungers 39. Each of the presser heads 41 is secured for axial adjustment in a hollow boss 42 formed on the ram head 37.

Carried by each of the conveyor slats 17 is a series of laterally aligned fruit holders indicated generally as 43. The holders 43 carried by each of the slats 17 are likewise aligned in vertical longitudinal planes which respectively include the common axes of the plungers 39 and presser heads 41. The longitudinal spacing of the slats 17 on the conveyor chains 16 and the longitudinal spacing between the plungers 39 and the presser heads 41 is the same so that when one series of holders 43 is axially aligned with the plungers 39, the next forwardly moving series of holders is axially aligned with the presser heads 41. The diameter of the sprockets 14 and 15 is such as to advance the conveyor the center to center distance between two adjacent slats each sixth of a revolution of the sprocket wheels, while the ratio arrangement of the Geneva gear 21 is 6:1 and the drive between the input shaft 23 of the Geneva gear and the crank shaft 27 is a 1:1 ratio. The result is that for each complete revolution of the crank shaft, the ram head will be reciprocated through one complete cycle from its normal upper position to its extreme lower position and returned, and the conveyor will be advanced one slat. The relative rotary positions of the sprockets 24 and 26 is such that the conveyor 19 is advanced during the latter portion of the up stroke of the ram cycle with the dwell of the conveyor occurring during the down stroke and the first portion of the up stroke.

Axially aligned with and below each of the plungers 39 is a fruit centering device or funnel indicated generally as 44 for feeding and centering fruit to be juiced singly on each of the holders 43. Positioned beneath the upper flight of the conveyor slats is a juice collecting trough indicated generally as 45 for collecting the juice extracted from the fruit and discharging it from the machine as will be further described.

As illustrated in the drawings, fruit is moved through the machine in four parallel lanes simultaneously. The number of lanes (or fruit juiced at a time) is arbitrary, however, and is governed, within practical limits, by the width of the machine.

Fruit holder

The fruit holders 43, shown in detail in Figures 7 to 11, are all identical and only one will be described.

As shown best in Figures 7 and 8, the fruit holder 43 comprises a base 45 consisting of a circular plate 46 which is secured to the inner face of the conveyor slat 17 by means of cap screws 47. The plate 46 has a central aperture 48 and a depending tubular portion 49 which is coaxial with the aperture 48 and which extends through an aperture 50 in the channel slat 17. The lower end of the depending portion 49 is cut-away on diametrically opposite sides to form side openings 51, while secured diametrically across the lower extremity is a cross piece 52.

Positioned above the plate 46 and coaxial with the aperture 48 is a concentric series of circular sleeves 53 of graduated diameters so that one encircles the other with a fairly close sliding fit. The lower ends of the sleeve 53 are cut-away on diametrically opposite sides to form an upper annular ring 54 and depending diametrically opposed legs 55. The upper ring portions 54 are all the same length, but the leg portions 55 are of graduated lengths, the legs of the outer sleeve 53 being the longest and those lying within the outer sleeve being progressively shorter. The upper edges of each of the rings 54 is radially curved, preferably on two radii, a curve of larger radius extending between the upper edge and the inner surface of the sleeve and the curve of smaller radius lying between the upper edge and the outer periphery of the sleeve. The outer sleeve 53 is secured to the plate 46 such as by screws 56 passing through the plate and into the lower ends of the legs, as clearly shown in Figure 7. The several sleeves 53 are secured together to permit limited relative axial movement by means of a screw 57 threaded into an outer sleeve and passing into a vertical slot 58 in the next smaller sleeve.

Supporting the sleeves 53 is an annular support 59 consisting of an outer cylinder 60 which closely encircles the larger sleeve 53 and an inner, concentric cylinder 61 which lies within the inner sleeve 53. The cylinders 59 and 61, intermediate their ends, are connected by an integrally formed, transverse web 62 perpendicular to the axis of the cylinders 59 and which is formed with diametrically opposed cut-outs 63, through which the legs 55 extend. The transverse web 62 engages the lower edges of the ring portions 54 of the sleeves 53 and serves as an elevating support for the sleeves 53 as will be further described. The outer cylinder 60 of the support 59 is formed with a peripheral flange 64 through which passes a plurality of vertical, headed bolts 65, the lower ends of which are screw threaded into the plate 46. Surrounding each of the bolts 65 between the flange 64 and the upper face of the plate 46 is a helical compression spring 66 which urges the support 59 upwardly against the heads of the bolts 65. This is the normal position of the holder, and it will be noted that the upper extremities of the sleeves 53 and the cylinder 60 all lie in the same flat plane as shown in Figure 7. Since the web 62 supports the sleeves 53 when the support 59 is depressed toward the plate 46 the sleeves, except the outer one, will be permitted to move downwardly until the lower extremities of their legs 55 contact the plate 46. In this position the upper edges of the sleeves and the inner cylinder 61 will define a relatively shallow upwardly opening cone as seen in Figures 14 and 15.

Closely fitting within the inner cylinder 61 of the support 59, for sliding axial movement therein, is a tube 67. This tube may be termed the "juice tube" and has a diameter of approximately 1½ inches, which is smaller than the diameter of the smallest fruit to be juiced by the machine and larger than the core diameter of the largest fruit. The upper end of the tube 67, in normal or extended position thereof, as will be further described, projects above the upper end of the cylinder 61 a distance less than the diameter of the smallest fruit and is cut-away radially to form a plurality of circumferentially spaced, upwardly extending incising knives or spears 68 whose upper ends are lozenge shaped with their points facing upwardly and their edges sharpened. The shank portions 70 of the spears 68 are relatively narrow and form therebetween radial juice passages 69 of substantial area.

The tube 67 passes through the aperture 48 in the base plate 46 and extends downwardly into the tubular extension 49. Secured about the lower extremity of the tube 67 is a ring 72 which is provided with diametrically opposed pin extensions 73 which move respectively in longitudinal slots 74 in the tubular extension 49 and, as seen in Figure 7, project beyond the periphery of the extension 49. The juice tube 67, when axially aligned with the plungers 39, is held rigidly in its upper position by means of a pair of circular, axially spaced rollers or discs 75 which are secured to the shaft 11 and respectively engage the extended ends of the pins 73 (best seen in Figures 2 and 4). When the conveyor 19 moves the holders 43 clockwise in Figures 1 and 4 away from the plungers 39, the pins 73 will, of course, move out of engagement with the rollers 75, and the juice tubes will be free to move downwardly. As the conveyor moves the holder around until it again reaches the rollers 75 on the lower flight of the conveyor, the pins 73 will again come into engagement with the periphery of the rollers and the juice tube will again be extended to its normal position as the conveyor moves around the sprockets 14.

Closely surrounding the tube 67 is an annular pulp cutting and peel holding element 76 which consists in a length of tubing fixed into a counterbore in the upper end of the cylinder 61 and projects slightly thereabove. The upper end of the element 76 has a peripheral groove 77 therein, the bottom wall of which coincides with the upper edge of the cylinder 61. The upper extremity of the element 76 is beveled inwardly from the groove 77 to a cutting edge 78 and is formed with radial slots 79 extending from the top of element 76 to the bottom of the groove 77. The slots 79 lie respectively adjacent the shanks 70 of the spears 68 and have widths corresponding substantially to the widths of the shanks. The width of the groove 77 approximates the average thickness of the fruit peel and is adapted to receive the peripheral edge of a circular incision made by the spears 68, as will be further described.

Extending axially through the juice tube 67 is a rod 80 of relatively small diameter and formed at its upper end with a circular flat head 81. The head 81 lies somewhat below the points of the spears 68 and is supported in this position, when the juice tube is in its extended position, by lugs 82 bent inwardly from the spear shanks 70 and engaging the lower face of the head 81. The rod 80 extends below the juice tube 67 passing through a small flanged collar 83 and through an aperture 84 in the cross piece 52 and has its lower extremity fitted with a nut 85. The collar 83 extends through the upper end of a tube 86 which is secured to and extends upwardly from the cross piece 52 axially within the tubular extension 49 of the holder base 46. The collar 83 is axially movable in the tube 86 and its upper movement is limited by an inturned end of the tube which engages the flange of the collar. Between the collar 83 and the cross piece 52 is positioned a helical compression spring 87 which urges the collar upwardly. Fixed to the rod 80 is a collar 88 which, upon downward movement of the rod, engages the collar 83. The relative positions of the collars 83 and 88 is such that the rod 81 will be permitted free movement until near the end of the juice extracting pressure, as will be later described, and thereafter its movement will be yieldingly limited by the spring 87 to squeeze the column of pulp lying above the rod head 81 and also to compensate for differences in peel thickness of the fruit, as will be better understood in the description of the operation of the machine.

*Fruit centering device and primary plunger*

The centering devices 44 are, in effect, downwardly converging funnels which center fruit of different sizes axially above the holders 43 to be pressed downwardly onto the incising spears and partially compressed by the plungers 39. The centering devices are essentially alike and only one will be described in detail.

As best shown in Figures 5 and 6 the centering device 44 is a longitudinally split funnel consisting of two opposed, trough shaped halves 90 and 91, each of which has a flat side wall 92, a flat rear wall 93, and a curved front wall 94. The front wall 94 converges from its upper edge toward the rear wall, while the side and rear walls at their lower ends converge inwardly to form, with the front wall, a frusto-cone when the two halves are in their normal vertical positions, as seen in Figure 5, with the small end somewhat less than the diameter of the smallest fruit and lying in the common axis of the holder 43 and plunger 39. The major width of the combined halves 90, in normal position, is sufficient to receive the largest fruit, while the upper edge of the front walls is spaced from the plunger 39 sufficiently for the largest fruit to pass into the funnel.

The halves of the centering funnel are suspended respectively from a cross bar 95, secured between opposite supports 7, for relative angular movement to the axis of the plunger 39 and transversely of the machine by means of studs 96 and 97 secured in the cross bar and extending perpendicularly thereto longitudinally of the machine. The studs 96 and 97 pass respectively through ears 98 and 99 attached respectively to the side walls of the funnel halves 90 and 91. The studs 97, suspending the adjacent halves of adjacent centering funnels, respectively carry a right angular lever indicated generally by 100 which is movable about the studs axes independently of the funnel halves. The lever 100 has a vertical arm 101 which extends downwardly from the stud 97 through a slot in the side wall 92 and normally engages the inner face of the side wall, and a horizontal arm 102 which extends radially from the stud and terminates in a downwardly beveled face 103.

The two halves of the centering funnel are connected together by a link 104 which is pivoted at opposite ends respectively to the rear walls of the two halves, one pivot being above the pivotal axis of the funnel halves and the other pivot being below and so arranged that angular movement of one half of the funnel about its stud will result in an equal and opposite angular movement of the other half. The two halves of the centering funnel are urged yieldingly together to their vertical positions by means of a tensioning spring 105 having its opposite ends anchored respectively to the two halves.

As seen in Figure 5 the horizontal arms 102 of adjacent levers 100 are directly opposite each other and their beveled ends lie in the path of movement of an enlarged head 106 of a vertical rod 107 which is adjustably held in and depends from a hollow boss 108 on the ram head 37 midway between adjacent plungers 39. The distance between the ends of the arms 102 is somewhat less than the width of the head 106 so that when the rod 107 lowers with the ram the head will pass the arms 102 with no movement of the funnel halves by rocking the levers about the studs relatively to the funnel halves. On the up stroke of the ram 37, however, the rod head 106 engages the under edges of the arms 102 and rocks the levers in an opposite direction or against the inner faces of the side walls of the funnel halves 91 to move the lower ends thereof outwardly apart, as shown in phantom lines in Figure 5, to clear the path of a fruit which has been positioned on the holder 43.

As has been stated, the plunger 39 is in axial alignment with the centering funnel 44 and the holder 43. Preferably this plunger has a substantial diameter, about the size or slightly smaller than the smallest fruit to be juiced. The fruit is fed in a line, preferably spaced, by any convenient conveying device into the open end of the centering funnel. The feeding need not be synchronized with the ram cycle since, if the plunger 39 is up, the fruit will fall directly to the bottom of the centering funnel and if the plunger is down, it will fall between the plunger and the inclined, curved front walls of the funnel until the plunger is next raised. As the fruit drops to the bottom of the centering funnel, the conical lower end centers the fruit coaxially with the holder and plunger. Since the bottom opening is, is the normal position of the funnel halves, less than the diameter of the fruit, it will be held in the funnel until forced through the lower end onto the holder 43 by action of the plunger 39 on the down stroke of the ram, the fruit spreading the two funnel halves against the tension of the spring 105 sufficiently to permit its passage. On the up stroke of the ram the funnel halves will be spread as described to permit the holder and the fruit thereon to be moved forwardly under the presser head.

The presser heads 41 are shown in detail in Figures 12 and 13 and, since each is identical with the other, only one will be described.

The presser head 41 comprises a rod 110 secured for axial adjustment in the hollow boss 42 of the ram head 37 and depends vertically therefrom. Adjacent the lower end of the rod 110, a circular plate 111 having a central hub 112 is secured, such as by set screws 113. Surrounding the lower end of the rod 110 below the plate 111 axially movable relatively thereto and to each other is a concentric series of sleeves 114, each having an external radial flange 115 at its upper end.

The outer sleeve 114 corresponds in diameter to the outer cylinder 60 of the holder support 59 to fit closely over the outer holder sleeve 53 and the inner sleeve 114 corresponds in diameter to the inner cylinder 61. The intermediate sleeves 114 correspond respectively with the holder sleeves 53, while the rod 110 has a diameter corresponding approximately to that of the juice tube 67. In operative position, the rod 110 is coaxially aligned with the juice tube and the sleeves 114 are coaxially aligned with corresponding sleeves 53 and the cylinders 60 and 61 of the holder support 59.

The presser sleeves 114 are individually suspended from the plate 111 for independent axial movement relatively thereto by means of a circular series of three equally spaced, headed bolts 116 which pass downwardly through free holes 117 in the plate 111 and have their lower ends threaded in the flange 115 of the sleeve. The bolts 117 suspending the different sleeves are of graduated lengths to space the flanges 115 substantially equidistantly apart in the normal or raised position of the presser head, as shown in Figure 12. Surrounding each of the bolts 116, between the plate 111 and the flange of the sleeve to which the bolt is attached, is a helical compression spring 118 which yieldingly urges the several sleeves downwardly from the plate 111. The bolts and springs between the plate and a lower flange pass through apertures 119 in an upper flange.

Figure 12:
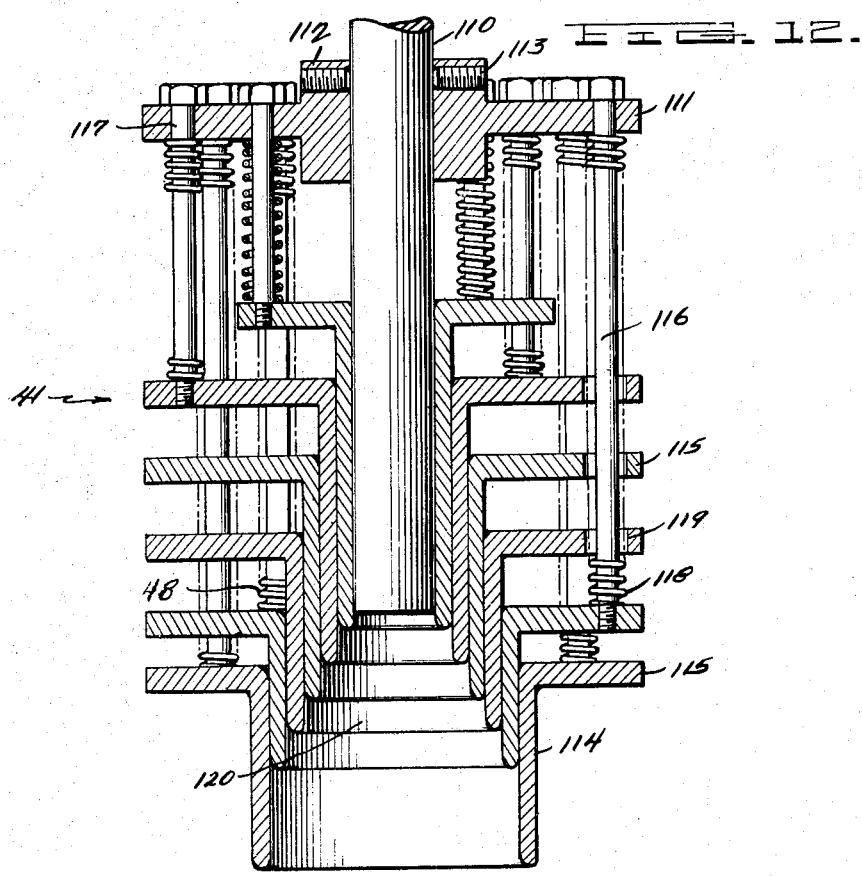
Figure 12 is a transverse sectional view of the presser head taken along the line 12—12 of Figure 2 looking in the direction of the arrows.
Figure 13:
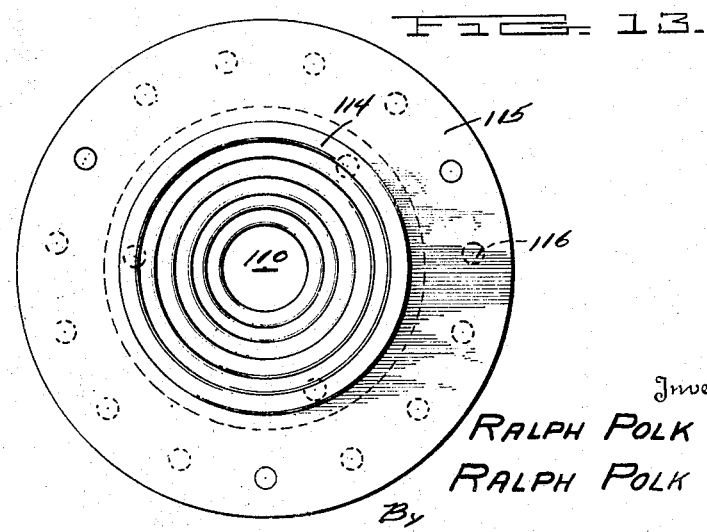
Figure 13 is a bottom plan view of the presser head.

As seen in Figure 12, the sleeves 114 are of graduated lengths and, in their normal or expanded position, their lower ends define roughly a hollow cone 120. In the normal position of the presser head the outer sleeve 114 extends below the next smaller sleeves a distance somewhat greater than the amount of movement of the holder support 59 while the inner sleeves 114 extend successively below the next smaller sleeves a distance approximately twice the distance of movement of a corresponding holder sleeve 53. The lower end of inner sleeve 114 extends slightly below the lower end of the rod 110. The lower end of each of the sleeves 114 is curved radially, preferably on two radii, the curve of longer radius extending between the end and the outer periphery of the sleeve.

It will be understood from the above that upon downward axial movement of the rod 110, when the lower ends of the sleeves 114 successively meet an obstruction they will be moved axially and successively on with respect to the next smaller against the yielding compression of the springs 118 and exert yielding forces in annular areas against the obstruction, while the rod 110 will exert a final positive force.

*Operation*

The machine is power driven, as set forth above, to advance the conveyor 18 the center distance between two adjacent lateral rows of the holders 43 with each reciprocation of the ram 37, the conveyor advance occurring during the latter portion of the up stroke of the ram and its dwell occurring during the down stroke and the first portion of the up stroke.

Ungraded, whole, citrus fruit is fed into the centering funnels 44 as already described, and on the down stroke of the ram 37 the plungers 39 force the fruit through the centering funnels down onto the juice tube incising spears 68, making a circular series of arcuate incisions through the peel of the bottom hemisphere of the fruit and upwardly into the fruit sections cutting through the membrane walls thereof. It will be recalled that the juice tubes 67, in the position of the holders under the plungers 39, are rigidly supported against downward axial movement by engagement of the pins 73 with the discs 75. The rod 80 is likewise supported against axial downward movement by engagement of its head 81 with the lugs 82 on the juice tube.

Continued downward movement of the plunger 39 until the ram reaches the bottom of its stroke will result in forcing the fruit downward over the upwardly extended end of the juice tube and onto the upper ends of the holder sleeves 53 and the center supporting cylinder 61 which results in positioning the apertures 79 in the juice tube within the fruit and partially flattening the fruit against the holder. The position of the plunger 39 with respect to the upper end of the juice tube is adjusted so that at the end of the down stroke of the ram, the lower end of the plunger will clear the upper end of the juice tube a distance at least equal to the maximum peel thickness of the fruit to prevent the spears 68 cutting through the peel of the upper hemisphere of the fruit. On the other hand, the series of spears 68 passing centrally into the fruit penetrates substantially all of the fruit sections so that the juice may be readily freed.

Depending upon the size of the fruit, the sleeves 53 and the support 49 will be more or less lowered against the compression of the springs 66 and a partial destruction of the juice sac structure and partial extraction of the juice will be accomplished. By virtue of the yielding support offered by the holder 43 and the incisions made within the fruit, the above partial extraction is obtained, even in the largest fruit without rupturing the peel except in the area of the above mentioned incisions. The plunger 39 moving the fruit against the head of the relatively stationary rod 80 forces a plug of the peel defined by the incisions up into the fruit compressing a column of pulp with some further juice extraction.

The juice extracted by pressure of the plunger 39 flows around the head 81 of the rod 80 and radially through the openings 79 between the spear shanks 70 and thence down through the juice tube to discharge through the openings 51 in the depending holder base tube 49 to collection in the trough 121. It is to be observed that when the fruit is forced down over the juice tube, the peel surrounding the opening made by the juice tube is forced into sealing engagement with the upper end of the inner cylinder 61 of the support 59, thus assuring that all of the extracted juice will flow into the juice tube. Further, the peel around the opening will be forced into the groove 77 of the element 76 (as seen in Figure 16) which prevents the peel curling upwardly away from its sealing engagement with the upper end of the cylinder 61.

Figure 2:
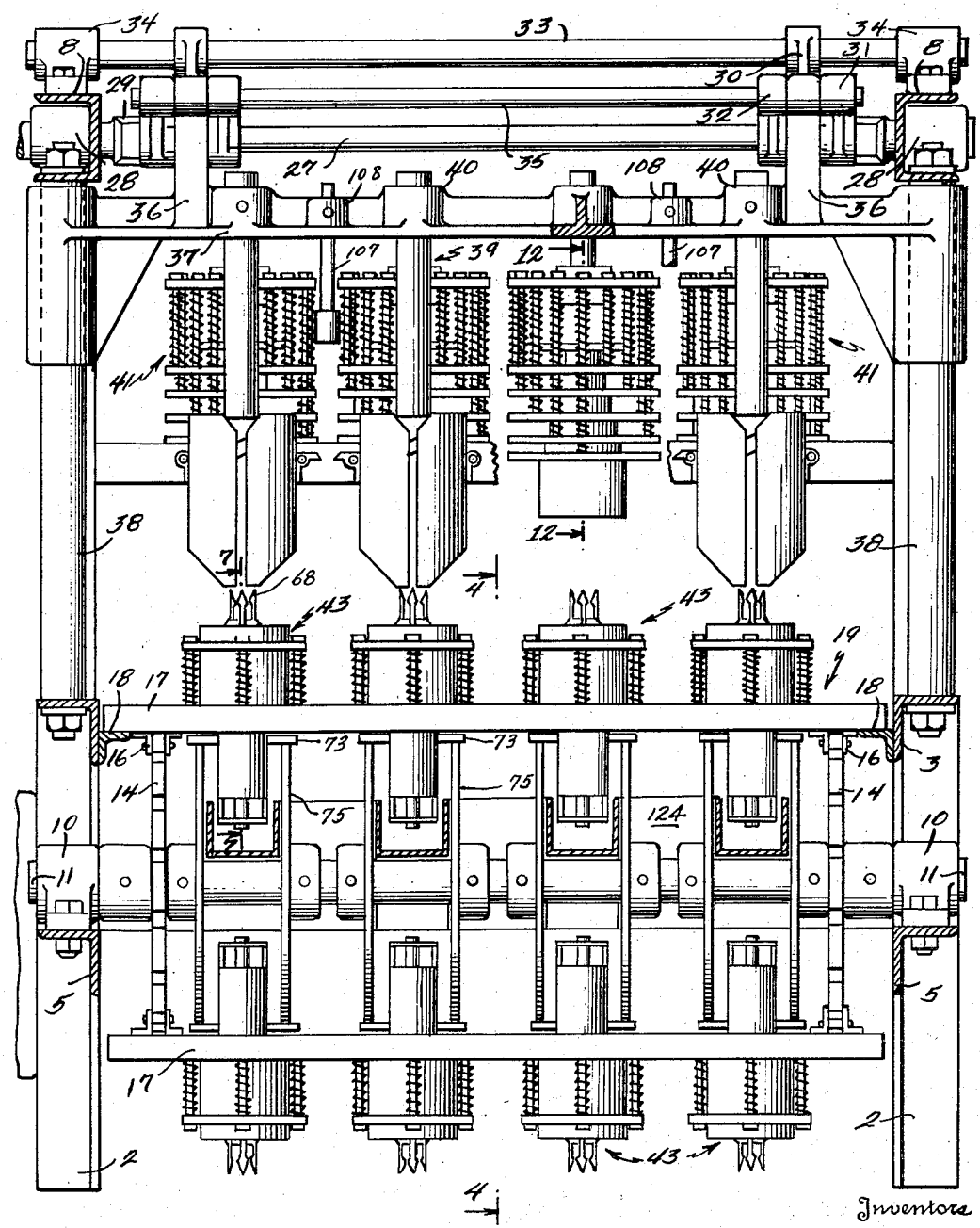
Figure 2 is a vertical transverse sectional view taken along the line 2—2 of Figure 1 looking in the direction of the arrows.

The juice collecting trough may be of any suitable design which will collect the juice from the above described first pressure stage and the second pressure stage to be described and discharge it from the machine. One which adequately serves the purpose is seen in Figures 1, 2, and 4 and comprises a central horizontal trough 121 which extends transversely across the frame 1 between the upper and lower flights of conveyor slats 17 and between the sprockets 14 and 15. This central trough has a half-round bottom in which rotates a screw conveyor 122. The half-round bottom extends upwardly in vertical side walls 123 which are cut away in rectangular notches communicating with oppositely extending wing troughs 124 and 125 lying directly beneath the longitudinal rows of depending holder tubes 49. As seen in Figure 4 the wing troughs 124 have bottoms which incline upwardly from the central trough 121 to a point somewhat beyond the depending tubes 49 of the row of holders lying under the plungers 39 to catch the juice extracted in the first pressure stage. The wing troughs 125 also have bottoms which incline upwardly from the central trough and extend a substantial distance to catch juice extracted by the second pressure stage and drippings therefrom as the holders are advanced. The wing troughs 124 and 125, it will be understood, feed the juice by gravity into the central trough 121 from which it is moved by the screw conveyor 122 to a suitable discharge at the side of the machine.

As the ram 37 moves during the latter part of its up stroke, the centering funnels 44 are opened, as set forth above, and the row of holding conveyors and the fruit thereon are advanced to bring the partially squeezed fruit under the presser heads 41, and an empty row of holders is advanced under the plungers 39. The centering funnels again close when the heads 106 of the rods 107 pass the arms 102 of the levers 100 and another row of whole fruit is fed into the bottoms of centering funnels and the above primary positioning and partial squeezing occurs on the next down stroke of the ram 37. Simultaneously therewith the partially squeezed fruit is operated on by the presser heads 41 to complete the juice extraction in the following manner and as clearly illustrated in Figures 14 and 15.

The first portion of the down stroke of the ram 37 moves the rod 110, head plate 111 and concentric series of sleeves 114 as an expanded unit with the sleeves 114 all in the extended position shown in Figure 12. As the ram 37 approaches the end of its down stroke, the lower end of the outer sleeve 114 engages the upper end of the cylinder 60 of the holder support 59 and forces it downward against the compression of the spring 66 until the lower end of the cylinder engages the upper face of the plate 46. It will be understood that the compressive force of the springs 118 is sufficiently greater than the compressive force of the springs 66 to accomplish the above movement. Lowering the support 59 leaves the holder sleeves 53 free to move downwardly until the lower ends of their legs 55 also engage the upper surface of the plate 46. In the lowered position of the holder 59 and the sleeves 53 the upper ends of the sleeves define a relatively shallow cone, as clearly seen in Figures 14 and 15. In this position the fruit lies axially within the hollow cone 120 formed by the sleeves 114.

Continued downward movement of the ram head 37, after the support 59 has reached its lower limit, will result in a relative axial movement of the outer sleeve 114 with the next smaller sleeve 114 against the force of the springs 118 between its flange and the head plate 111 and, when the last named sleeve meets an obstruction, it will be moved relatively to the next smaller sleeve against the force of its springs, and so on.

The partially squeezed fruit of the holder 43 will be encircled by one or more of the outer sleeves 114, depending upon the size of the fruit. In the example shown in Figures 14 and 15 the fruit would be encircled by the next largest sleeve. Thereafter the sleeve next smaller than the encircling sleeve 114 will press the peripheral edge of the fruit in an annular band between it and its corresponding holding sleeve 53, as shown in Figure 14. Thereafter with further downward movement of the ram, the next smaller sleeve 114 will squeeze an annular band of the fruit between this sleeve and its corresponding holding sleeve 53. These successive squeezing operations of gradually decreasing annular bands of the fruit are continued with further down stroke of the ram until the inner sleeve 114 compresses the fruit between it and the inner cylinder 61. Each of the above pressures, it will be noted, is against the yielding force of the springs 118. Thereafter, during the final down stroke of the ram, the rod 110 exerts a positive squeezing force on the center area of the fruit against the head 81 of the rod 80 urged toward the rod 110 by yielding force of the spring 87. Thus the sleeves 114 exert a yielding pressure on the fruit, thereby imparting a gradually increasing pressure on the fruit. Further, this pressure progresses in definite stages inwardly toward the center of the fruit forcing the juice inwardly toward the juice tube 67, progressively clamping the peel and precluding any outward rupture of the peel.

It will be recalled that the juice tube 67, except in the position of the holder under the plungers 39, is unsupported and is, therefore, free to move downwardly under action of the presser head 41 without being forced through the upper hemisphere of the peel. Under pressure of the presser head, the lower hemisphere of the fruit is pressed into the upwardly coned holder and is only slightly flattened. The upper hemisphere of the peel, however, is gradually pressed against the lower hemisphere and reversed which permits the two hemispheres of peel to be brought together without substantial radial expansion.

Under the axial pressures described above, the juice and pulp are forced inwardly and radially through the openings 69 in the juice tube. These openings are of substantially large area and offer very little resistance to the passage of juice and pulp. Portions of the pulp structure, that is juice sacs and portions of the membrane walls, remain more or less intact and project through the openings 79 into the interior of the juice tube. As the juice tube is forced downwardly, however, relatively to the element 76 during the latter portion of the down stroke of the presser head, this portion of the pulp will be sheared off between the cutting edge 78 of the element 76 and the lower edges of the spear points 68 of the incising knives, as shown in Figure 16. Until near the lower limit of the down stroke of the ram, the rod 80 moves freely with the juice tube. When this point is reached, the collar 88 engages the collar 83 yieldingly supporting the rod 80 and the juice tube continues to be moved relatively thereto until the end of the down stroke. Juice from the column above the head 81 will be extracted by pressure of the spring 89 until the plug of peel contacts the upper hemisphere. Thereafter the spring 87 is compressed to compensate for peel thickness.

On the up stroke of the ram the presser head, as it moves away from the holder, assumes its normal expanded position as shown in Figure 12, and the holder likewise assumes its normal position as shown in Figure 7. As soon as the lower end of the presser head clears the holder, the Geneva motion gear 21 again becomes effective to advance the conveyor another step moving a new row of holders with fruit pressed thereon by the last down stroke of the ram under the presser heads, and an empty row of holders again under the plungers 39. As the holders containing the empty peels advance down around the sprockets 15 into the lower flight of the conveyor slats, they will drop off the holders and may be suitably moved away from the machine. If desired, suitable stripping fingers may be provided to assist in removal of the empty peels from the holders.

During the second pressure stage peel extractives will be expelled. The peel, however, is progressively pressed into sealing engagement with the sleeves 53 and inner cylinder 61 with the result that the extractives are expelled progressing from the outer periphery of the peel toward the center and flows downwardly between the sleeves 53 onto the channel shaped slats 17. When the pressure is exerted on the portion of the fruit adjacent the juice tube, therefore, extractives are pressed from only a very small area of the peel eliminating the necessity of a highly effective seal at the juice tube. It will be noted in Figure 7 that a small, upstanding annular dam 126 is formed on the upper surface of the plate 46 about the aperture 48 to prevent the peel extractives flowing downward through this aperture. The peel extractives collected by the slats 17 and that portion remaining on the holder 43 may be washed off by water sprays (not shown) at a suitable position on the machine as the slats move thereby. For example, the washing may be performed as the slats move along the lower flight of the conveyor.

From the foregoing it will be seen that the invention provides a method and apparatus for extracting the juice from whole, ungraded citrus fruit by a first stage in which the fruit is punctured in a limited central region through one hemisphere of the peel to provide openings in the peel and section walls through which the juice may be expressed, and a partial extraction performed to render the fruit relatively pliable, and thereafter by a second stage in which the opposite hemisphere of the peel is progressively reversed and pressed against the incised hemisphere in progressively decreasing annular bands from the outside to the center which completely extracts the juice, while confining the peel against radial expansion and outward bursting rupture due to the squeezing pressure. The method and apparatus is completely automatic, the operation is rapid and will completely extract the juice, substantially free from peel and rag extractives, from fruit of a substantial size range without pregrading.

The apparatus shown and described is by way of a preferred structure and is subject to many modifications which will be apparent to those skilled in the art. The invention is, therefore, not to be limited to the specific structure shown, but is to be limited only by the appended claims.

We claim:

1. A method of extracting the juice from whole citrus fruit comprising incising the fruit at least through the rind of one hemisphere of the fruit, and applying diametrically opposed pressures to the rind in a plurality of opposed annular bands substantially concentric with the axis of the incision and progressively inwardly from the periphery of the fruit to said axis to progressively press the rind of the incised hemisphere against the rind of the opposite hemisphere.

2. A method of extracting the juice from whole citrus fruit comprising incising the fruit at least through the rind of one hemisphere of the fruit, and applying opposed pressures to the rind in a plurality of opposed annular bands substantially concentric with the axis of the incision and progressively inwardly from the periphery of the fruit to said axis to progressively press the rind of the incised hemisphere against the rind of the opposite hemisphere, at least one of the opposed pressures being yieldable whereby mutilation of the rind is avoided.

3. A method of extracting the juice from whole citrus fruit comprising incising the fruit at least through the rind of one hemisphere of the fruit, and applying diametrically opposed pressures to the rind in a plurality of opposed annular bands substantially concentric with the axis of the incision and progressively inwardly from the periphery of the fruit to said axis to progressively press the rind of the incised hemisphere against the rind of the opposite hemisphere while supporting the rind against substantial outward expansion.

4. A method of extracting the juice from whole citrus fruit comprising incising the fruit at least through the rind of one hemisphere of the fruit, confining the fruit against outward expansion radially of the axis of the incision substantially concentric with the axis of the incision, and applying directly opposed pressures to the rind in a plurality of opposed annular bands substantially concentric with the axis of the incision and progressively inwardly from the periphery of the fruit to said axis to progressively press the rind of the incised hemisphere against the rind of the opposite hemisphere, at least one of the opposed pressures being yieldable whereby mutilation of the rind is avoided.

5. A method of extracting the juice from whole citrus fruit comprising incising the fruit at least through the rind of one hemisphere of the fruit, and applying diametrically opposed pressures to the rind in a plurality of opposed annular bands substantially concentric with the axis of the incision and progressively inwardly from the periphery of the fruit to said axis to progressively press the rind of the incised hemisphere against the rind of the opposite hemisphere, and while supporting the incised hemisphere in its substantially natural shape.

6. A method of extracting the juice from whole citrus fruit comprising cutting a circular series of arcuate incisions through the rind of one hemisphere of the fruit and into the juice bearing pulp along an axis of the fruit, applying diametrically opposed pressures to the rind in a plurality of opposed annular bands substantially concentric with the center axis of said incisions and progressively inwardly from the periphery of the fruit to said axis, to progressively flatten the rind of the opposite hemisphere, and supporting the plug of rind defined by said incisions from outward expulsion under said pressures.

7. A method of extracting the juice from whole citrus fruit comprising cutting a circular series of arcuate incisions through the rind of one hemisphere of the fruit and into the juice bearing pulp along an axis of the fruit, applying diametrically opposed pressures to the rind in a plurality of opposed annular bands substantially concentric with the center axis of said incisions and progressively inwardly from the periphery of the fruit to said axis, to progressively flatten the rind of the incised hemisphere against the rind of the opposite hemisphere, while supporting the rind against outward bursting of the juice bearing pulp through said rind except in the region defined by said incisions, and supporting the plug of rind defined by said incisions against outward expulsion due to said pressures.

8. A method of extracting the juice from whole citrus fruit comprising incising the fruit at least through the rind of one hemisphere of the fruit, applying pressure to the rind along the axis of said incision to a degree to partially compress the fruit and rupture a portion of the juice sacs of the fruit but insufficient to cause rupture of the rind, and subsequently applying diametrically opposed pressures to the rind in a plurality of opposed annular bands substantially concentric with the axis of the incision and progressively inwardly from the periphery of the fruit to said axis to progressively press the rind of the incised hemisphere against the rind of the opposite hemisphere.

9. A method of extracting the juice from whole citrus fruit comprising incising the fruit through the rind of one hemisphere of the fruit and substantially into the juice bearing pulp, applying yielding pressure to the rind along the axis of said incision to a degree to partially compress the fruit and rupture a portion of the juice sacs of the fruit but insufficient to cause rupture of the rind, and subsequently applying diametrically opposed pressures to the rind of a plurality of opposed annular bands substantially concentric with the axis of the incision and progressively inwardly from the periphery of the fruit to said axis to progressively press the rind of the incised hemisphere against the rind of the opposite hemisphere.

10. A method of extracting the juice from whole citrus fruit comprising incising the fruit at least through the rind of one hemisphere of the fruit, applying pressure to the rind along the axis of said incision to a degree to partially compress the fruit and rupture a portion of the juice sacs of the fruit but insufficient to cause rupture of the rind, and subsequently applying diametrically opposed pressures to the rind in a plurality of opposed annular bands substantially concentric with the axis of the incision and progressively inwardly from the periphery of the fruit to said axis to progressively press the rind of the incised hemisphere against the rind of the opposite hemisphere, while supporting the rind against substantial outward expansion.

11. Apparatus for extracting the juice from whole citrus fruit comprising a fruit holding support having an opening therethrough, means adjacent said opening for incising the fruit through at least the peel thereof, a concentric series of cylindrical pressing members axially aligned with said opening and mounted for individual axial movement relatively to the support, and means for exerting axial pressure individually on said members to move the same toward the support into successive pressing engagement with concentric annular areas of the peel of a fruit on the support to press the peel against said support and express the juice through said opening.

12. Apparatus for extracting the juice from whole citrus fruit comprising a fruit holding support having an opening therethrough, means adjacent said opening for incising the fruit through at least the peel thereof, a concentric series of cylindrical pressing members axially aligned with said opening and mounted for individual axial movement relatively to the support, and means including resilient compression elements for exerting yielding pressure individually on said members to move the same toward the support into successive pressing engagement with concentric annular areas of the peel of a fruit on the support to press the peel against said support and express the juice through said opening.

13. Apparatus for extracting the juice from whole citrus fruit comprising a fruit holding support having an opening therethrough, means adjacent said opening for incising the fruit through at least the peel thereof, a concentric series of cylindrical pressing members axially aligned with said opening and mounted for individual axial movement relatively to the support, and means for exerting axial pressure individually on said members to move the same toward the support into successive pressing engagement with concentric annular areas of the peel of a fruit on the support to press the peel against said support and express the juice through said opening, the largest pressure member being of sufficient diameter for at least one of said members to encircle the fruit and confine the peel substantially against radial expansion.

14. Apparatus for extracting the juice from whole citrus fruit comprising a fruit holding support having an opening therethrough, means adjacent said opening for incising the fruit through at least the peel thereof, a concentric series of cylindrical pressing members axially aligned with said opening and mounted for individual axial movement relatively to the support, a supporting element common to said members and carrying the same, compression means associated between said element and each of said members, and means for moving said element and members toward the support to bring said members in to successive yielding engagement with annular areas of the peel to progressively press the peel against the support and express the juice through said opening.

15. Apparatus for extracting the juice from whole citrus fruit comprising a fruit holding support having an opening therethrough, means adjacent said opening for incising the fruit through at least the peel thereof, a concentric series of cylindrical pressing members axially aligned with said opening and mounted for individual axial movement relatively to the support, a supporting element common to said members and carrying the same, compression means associated between said element and each of said members, and means for moving said element and members toward the support to bring said members in to successive yielding engagement with annular areas of the peel to progressively press the peel against the support and express the juice through said opening, the largest pressing member being of sufficient diameter for at least one of said members to encircle the fruit and confine the peel substantially against radial expansion.

16. Apparatus for extracting the juice from whole citrus fruit comprising a fruit holding support having an opening therethrough, means adjacent said opening for incising the fruit through at least the peel thereof, a concentric series of cylindrical pressing members axially aligned with said opening and mounted for individual axial movement relatively to the support, said members having relatively extended axial relationship from the larger to the smaller whereby the ends thereof facing the support define a hollow cone opening toward said support, and means exerting yielding axial pressure on said members to move the same toward said support into pressing engagement with concentric annular areas of the peel of the fruit successively from the periphery thereof to the center to progressively press the peel against the support and express the juice through said opening.

17. Apparatus for extracting the juice from whole citrus fruit comprising a fruit holding support having an opening therethrough, means adjacent said opening for incising the fruit through at least the peel thereof, a concentric series of cylindrical pressing members axially aligned with said opening and mounted for individual axial movement relatively to the support, said members having relatively extended axial relationship from the larger to the smaller whereby the ends thereof facing the support define a hollow cone opening toward said support, and means exerting yielding axial pressure on said members to move the same toward said support into pressing engagement with concentric annular areas of the peel of the fruit successively from the periphery thereof to the center to progressively press the peel against the support and express the juice through said opening, the largest pressing member being of sufficient diameter for at least one of said members to encircle the fruit and confine the peel substantially against radial expansion.

18. Apparatus for extracting the juice from citrus fruit comprising a circular fruit holding support having a central opening and a pressure surface substantially normal to the longitudinal axis of the opening, a tubular conduit carried in said opening for axial movement relatively to the support, said conduit having a slotted end extending normally above said surface and constituting a series of incising knives adapted to penetrate into a fruit pressed on the support, a concentric series of cylindrical pressing members axially aligned with said opening and mounted for individual axial movement relatively to the support, and means for exerting axial pressure individually on said members to move the same toward the support into successive pressing engagement with concentric annular areas of the peel of the fruit to press the peel against said surface and express the juice into said conduit.

19. Apparatus for extracting the juice from citrus fruit comprising a circular fruit holding support having a central opening and a pressure surface surrounding the central opening, a tubular conduit carried in said opening for axial movement relatively to the support, said conduit having a slotted end extending normally above said surface and constituting a series of incising knives adapted to penetrate into a fruit pressed on the support, a concentric series of cylindrical pressing members axially aligned with said opening and mounted for individual axial movement relatively to the support, and means for exerting axial pressure individually on said members to move the same toward the support into successive pressing engagement with concentric annular areas of the peel of the fruit to press the peel against said surface and express the juice into said conduit, the largest pressing member being of sufficient diameter for at least one of said members to encircle the fruit and confine the peel substantially against radial expansion.

20. Apparatus for extracting the juice from whole citrus fruit comprising two axially opposed series of concentric cylindrical members, each series including a support mounting the members thereof for relative telescoping movement, each support including resilient compression means urging the members of one series axially toward the members of the opposing series, one of said series having a central opening and fruit incising means surrounding the same, and means for moving relatively said series axially to press concentric annular areas of the peel of one hemisphere of a fruit positioned axially therebetween into engagement with corresponding annular areas of the opposite hemisphere and express the juice into said opening.

21. Apparatus for extracting the juice from whole citrus fruit comprising two axially opposed series of concentric cylindrical members, each series including a support mounting the members thereof for relative telescoping movement, each support including resilient compression means urging the members of one series axially toward the members of the opposing series, one of said series having a central opening and fruit incising means surrounding the same, and means for moving one series axially toward the opposite series to press concentric annular areas of the peel of one hemisphere of a fruit positioned axially therebetween into engagement with corresponding annular areas of the opposite hemisphere and express the juice into said opening, the largest of said members being of sufficient internal circumference for at least one opposed pair of members when moved together to encircle the fruit and confine the peel against substantial radial expansion.

22. Apparatus for extracting the juice from whole citrus fruit comprising two axially opposed series of concentric cylindrical members, each series including a support mounting the members thereof for relative telescoping movement, each support including resilient compression means urging the members of one series axially toward the members of the opposing series, one of said series having a central opening, a tubular conduit carried in said opening for axial movement therein, said tube having a slotted end projecting normally beyond the opening toward the opposite series and constituting a series of fruit incising knives, and means for moving one series axially toward the opposite series to press concentric annular areas of the peel of one hemisphere of a fruit positioned axially therebetween into engagement with corresponding annular areas of the opposite hemisphere and express the juice into said conduit.

23. In a machine for extracting the juice from whole citrus fruit a circular fruit holder having a peel supporting surface and a central opening, cutting means adjacent the opening for making an incision into a fruit positioned centrally on the holder, conveyor means carrying the holder for moving the same from a first and to a second station, a reciprocable plunger member axially aligned with said holder at the first station and operable to press a fruit onto said cutting means and surface, said plunger having a limit of movement toward the holder sufficient to express a portion of the juice through said incision and into said opening but insufficient to cause rupture of the peel except in the region of the incision, and a presser head comprising a concentric series of cylindrical pressing members normally defining a hollow cone axially aligned with the holder in the second station, compressible supporting means mounting said members for relative yielding axial movement and for reciprocable movement as a group relatively to the support to bring the ends of said members into yielding successive engagement with the peel of the fruit to press concentric annular bands of the same successively onto said support and express the juice through said incision into said opening, and means for reciprocating said plunger and pressure head.

24. Apparatus according to claim 23 in which the means for reciprocating the plunger and presser head includes a ram member common to both for moving the same simultaneously and in which said conveyor is endless and carries a plurality of said holders aligned and spaced thereon for successive movement to said stations.

25. Apparatus according to claim 23 including a funnel like centering device at said first station and axially aligned with said plunger to center the fruit on said holder under action of the plunger.

26. Apparatus according to claim 23 in which the largest of said concentric series of cylindrical pressing members is of sufficient diameter for at least one of said pressing members to encircle the fruit and confine the peel substantially against radial expansion.

27. A method of extracting the juice from whole citrus fruit comprising incising the fruit at least through the rind of one hemisphere of the fruit, and applying diametrically opposed pressures to the rind in a plurality of opposed annular bands substantially concentric with the axis of the incision and progressively lower from the periphery of the fruit to said incision to press the rind of the incised hemisphere against the rind of the opposite hemisphere.

RALPH POLK, Sr.
RALPH POLK, Jr.

References Cited in the file of this patent

UNITED STATES PATENTS

| Number | Name | Date |
|--------|------|------|
| 286,265 | Cooper | Oct. 9, 1883 |
| 975,204 | Blanchard | Nov. 8, 1910 |
| 1,960,501 | Maull | May 29, 1934 |
| 1,965,910 | Schiller | July 10, 1934 |
| 2,018,932 | Thorne | Oct. 29, 1935 |
| 2,346,561 | Dalay | Apr. 11, 1944 |
| 2,420,679 | Pipkin | May 20, 1947 |
| 2,420,681 | Peterson | May 20, 1947 |
| 2,475,559 | Wilson | July 5, 1949 |

FOREIGN PATENTS

| Number | Country | Date |
|--------|---------|------|
| 32,483 | Germany | Aug. 10, 1885 |